United States Patent
Masputra et al.

(10) Patent No.: US 7,839,875 B1
(45) Date of Patent: Nov. 23, 2010

(54) METHOD AND SYSTEM FOR AN EFFICIENT TRANSPORT LOOPBACK MECHANISM FOR TCP/IP SOCKETS

(75) Inventors: Cahya Adiansyah Masputra, Menlo Park, CA (US); Kacheong Poon, Kowloon (CN); Thirumalai Srinivasan, Menlo Park, CA (US)

(73) Assignee: Oracle America Inc., Redwood City, CA (US)

( * ) Notice: Subject to any disclaimer, the term of this patent is extended or adjusted under 35 U.S.C. 154(b) by 1343 days.

(21) Appl. No.: 11/179,702

(22) Filed: Jul. 12, 2005

(51) Int. Cl.
*H04L 12/28* (2006.01)
(52) U.S. Cl. ........................ 370/412; 370/465
(58) Field of Classification Search ........... 370/249, 370/412, 465
See application file for complete search history.

(56) References Cited

U.S. PATENT DOCUMENTS

| | | | |
|---|---|---|---|
| 5,928,324 A * | 7/1999 | Sloan | 709/203 |
| 6,781,994 B1 * | 8/2004 | Nogami et al. | 370/395.1 |
| 7,139,268 B1 * | 11/2006 | Bhagwat et al. | 370/389 |
| 2001/0023460 A1 * | 9/2001 | Boucher et al. | 709/250 |
| 2002/0032766 A1 * | 3/2002 | Xu | 709/223 |
| 2003/0016685 A1 * | 1/2003 | Berggreen | 370/412 |
| 2003/0231632 A1 * | 12/2003 | Haeberlen | 370/395.5 |
| 2005/0138189 A1 * | 6/2005 | Tripathi et al. | 709/230 |

* cited by examiner

*Primary Examiner*—Kevin C Harper
*Assistant Examiner*—Sai-Ming Chan
(74) *Attorney, Agent, or Firm*—Osha • Liang LLP

(57) ABSTRACT

A method for data transfer using a TCP loopback connection, involving establishing a TCP connection between a first endpoint and a second endpoint, determining whether fusing of the first endpoint with the second endpoint is permitted, if fusing of the first endpoint with the second endpoint is permitted assigning the first endpoint to a serialization queue, allocating the serialization queue for the second endpoint, fusing the first endpoint with the second endpoint, and transferring data from the first endpoint to the second endpoint.

19 Claims, 4 Drawing Sheets

US 7,839,875 B1

METHOD AND SYSTEM FOR AN EFFICIENT TRANSPORT LOOPBACK MECHANISM FOR TCP/IP SOCKETS

BACKGROUND

Typically, when a TCP/IP application wants to send information, the information travels down the protocol layers to IP where the information is encapsulated in an IP datagram. The IP datagram then proceeds down to the data link layer of the device's physical network for transmission to the next hop, on the way to the IP destination. However, operating systems typically support a loopback interface that allows for a client and a server on the same host machine to communicate with each other using TCP/IP. In this case, changing the IP address of the destination server to the loopback address results in a TCP loopback connection being established, and information is exchanged between a client and server on the same host machine.

In some operating systems, when using a TCP/IP loopback connection, although the transport layer detects that the destination of the information is local, the operating system performs complete processing of the data in the transport and network layers prior to sending the IP datagram back to itself. In effect, the operating system treats the IP datagram as if its coming from the network. Thus, multiple layers of protocol processing and logic are applied to the loopback traffic carrying data. Even though the stack is aware that the endpoints are local to the host, the stack pretends that the data originated externally. In some cases, treating a local IP datagram as if its coming from the network results in unnecessary processing such as inspecting, packetizing, and corresponding with network protocols.

SUMMARY

In general, in one aspect, the invention relates to a method for data transfer using a TCP loopback connection, comprising establishing a TCP connection between a first endpoint and a second endpoint, determining whether fusing of the first endpoint with the second endpoint is permitted, if fusing of the first endpoint with the second endpoint is permitted assigning the first endpoint to a serialization queue, allocating the serialization queue for the second endpoint, fusing the first endpoint with the second endpoint, and transferring data from the first endpoint to the second endpoint.

In general, in one aspect, the invention relates to a system, comprising a first endpoint configured to transfer data to a second endpoint, wherein the data is transferred using a TCP loopback connection, and a serialization queue allocated to the first endpoint and the second endpoint, wherein the serialization queue is configured to maintain the order of the data transfer, wherein the first endpoint and the second endpoint are fused.

In general, in one aspect, the invention relates to a computer system for data transfer using a TCP loopback connection, comprising a processor, a memory, a storage device, and software instructions stored in the memory for enabling the computer system under control of the processor, to establish a TCP connection between a first endpoint and a second endpoint, determine whether fusing of the first endpoint with the second endpoint is permitted, if fusing of the first endpoint with the second endpoint is permitted assign the first endpoint to a serialization queue, allocating the serialization queue for the second endpoint, fuse the first endpoint with the second endpoint, and transfer data from the first endpoint to the second endpoint.

Other aspects of the invention will be apparent from the following description and the appended claims.

DETAILED DESCRIPTION

Figure 1:
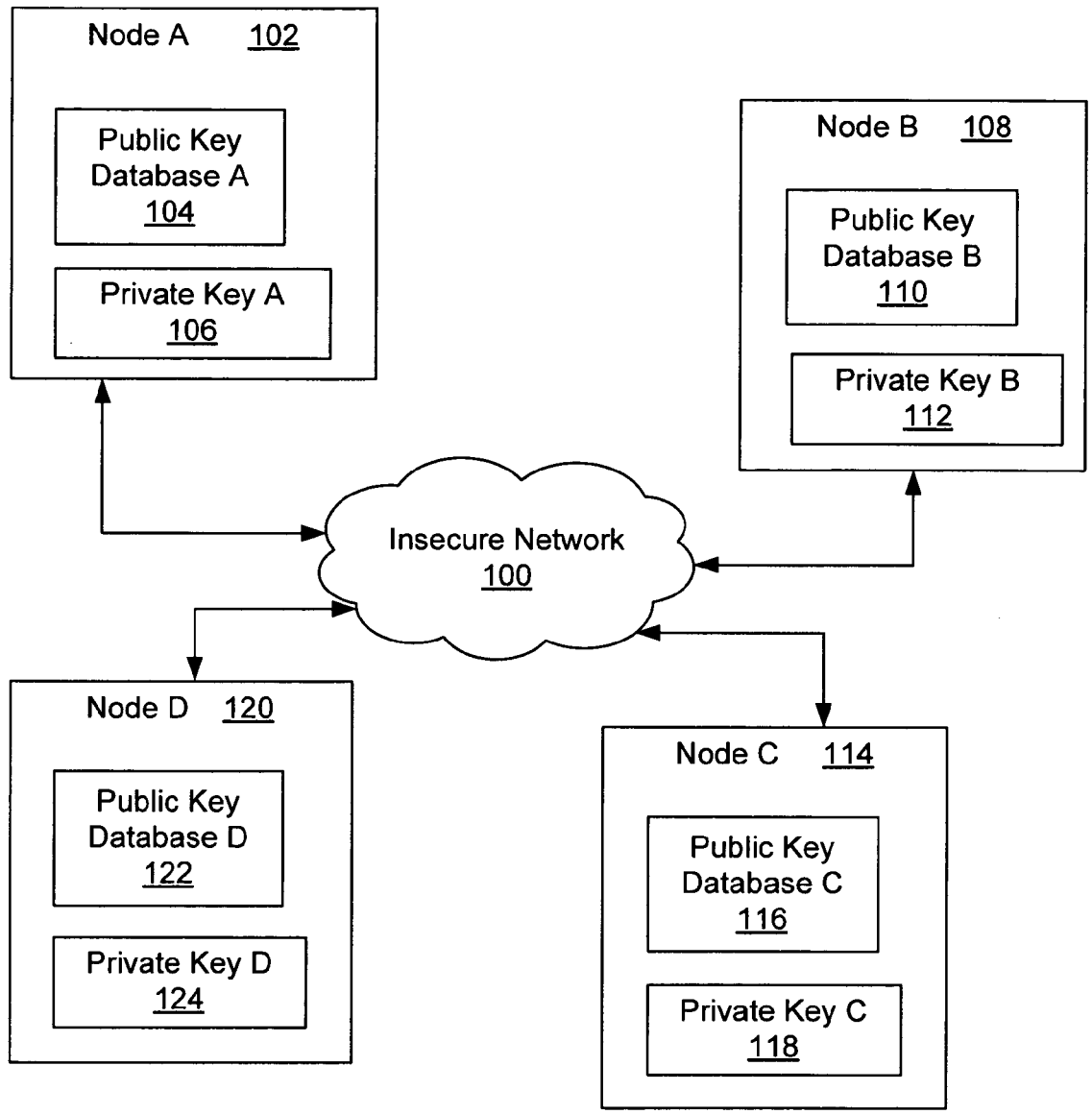
FIG. 1 shows a TCP loopback connection system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to reducing the processing associated with TCP loopback mechanisms. Specifically, embodiments of the invention relate to short-circuiting or "fusing" both endpoints of the TCP loopback connection, such that the communication channel is optimized and the amount of processing required for loopback traffic is reduced. More specifically, embodiments of the invention fuse both TCP loopback connection endpoints by ensuring both endpoints are allocated the same serialization queue.

FIG. 1 shows a TCP loopback connection system in accordance with one embodiment of the invention. The system of FIG. 1 includes Application A (102) and Application B (104) on the same host (100) machine, and the TCP layers of both Application A ($TCP_A$ (108)) and Application B ($TCP_B$ (110)) in the network protocol stack (106).

Because Application A (102) and Application B (104) are located on the same host, communication between Application A (102) and Application B (104) is possible using a TCP loopback connection. A TCP loopback connection uses a special loopback address, which allows the host to address itself in the same manner the host addresses remote systems. In a TCP loopback connection, Application A (102) and Application B (104) are known as TCP endpoints. In one embodiment of the invention, when using a TCP loopback connection to communicate, TCP endpoints are fused together, so that each endpoint is aware of the existence of the other endpoint. In one embodiment of the invention, fusion of the endpoints occurs when the standard TCP handshake has been completed and both endpoints have reached the ESTABLISHED state. The ESTABLISHED state is the state of data transfer.

Those skilled in the art will appreciate that fusing the two endpoints forms, in effect, a bi-directional pipe for the exchange of data between the two TCP endpoints. Thus, upon fusing the two endpoints, data exchanged is no longer processed by the network protocol stack, and a more direct path (i.e., a "shortcut") is used to exchange data. Thus, rather than processing a packet of data via the TCP, IP, and hardware layers of a transmitting and receiving system, the packet is only processed in the TCP layers of both the endpoints.

In one embodiment of the invention, to ensure that both endpoints remain part of the TCP loopback connection, both endpoints are associated with the same serialization queue (not shown). The serialization queue is a first-in, first-out (FIFO) data structure and is bound to a specific central processing unit (CPU). The serialization queue queues packets destined for the specific CPU that the serialization queue is bound to. Thus, by associating both endpoints with the same serialization queue, all packets for a given TCP loopback connection are placed in the same serialization queue and are processed by the same CPU. Further, the serialization queue is responsible for maintaining the order of the data transfer that occurs between Application A (102) and Application B (104).

Particularly, the serialization queue operates such that only a single thread can process a given connection at a time. Said another way, the serialization queue thread processes each queued operation of the data transfer between TCP endpoints uninterrupted, thus serializing access to the data structures of each TCP endpoint by multiple threads (e.g., for both read and write operations) in a TCP loopback connection. For example, suppose Application A (102) performs a write operation, and Application B (104) performs a read operation and a subsequent write operation. Next, suppose that Application A (102) terminates the TCP loopback connection. Thus, in one embodiment of the invention, if an application performs a close (i.e., attempts to terminate the TCP loopback connection), then data is not lost, and the TCP endpoints are unfused in time for any data transferred after the close operation to be performed in a traditional manner, i.e., using the network protocol stack (106). Further, assigning the same serialization queue to the TCP endpoints prevents the system from failing or crashing due to race conditions in multiprocessor machines.

Continuing with FIG. 1, in one embodiment of the invention, when Application A (102) performs a write operation in the data transfer phase of the TCP loopback connection, the data is transferred via the transmitted endpoint's TCP layer (i.e., $TCP_A$ (108)) and is queued in the receiving endpoint's TCP layer (i.e., $TCP_B$ (110)) in the network protocol stack (106). Further, in one embodiment of the invention, when the first packet is placed in the queue (112), Application B (104) is signaled to indicate that data has been queued in $TCP_B$ (110). In one embodiment of the invention, $TCP_B$ (110) includes two entry points: the queue (112) and the PULL (114). Both entry points include a signaling mechanism. When data is queued, TCP triggers a signal to indicate to Application B (104) that data is waiting to be read. In one embodiment of the invention, if Application B (104) does not read all the data in the queue (i.e., the queue is not empty upon Application B (104) retrieving data), then another signal is triggered from the PULL (114) entry point. In one embodiment of the invention, Application B (104) includes functionality to know from which entry point the signal originated. Thus, if a signal is triggered from the PULL (114) entry point, then Application B (104) knows that additional data remains in the queue (112), but new data has not been queued.

As described above, in one embodiment of the invention, once the data transfer phase completes, the TCP endpoints are unfused (i.e., the endpoints are no longer aware of each other). If either endpoint wishes to terminate the TCP loopback connection at any point during the data transfer phase, then the endpoints are unfused and the remainder of the data transfer phase is processed in a traditional manner, i.e., using the network protocol stack.

Figure 2:
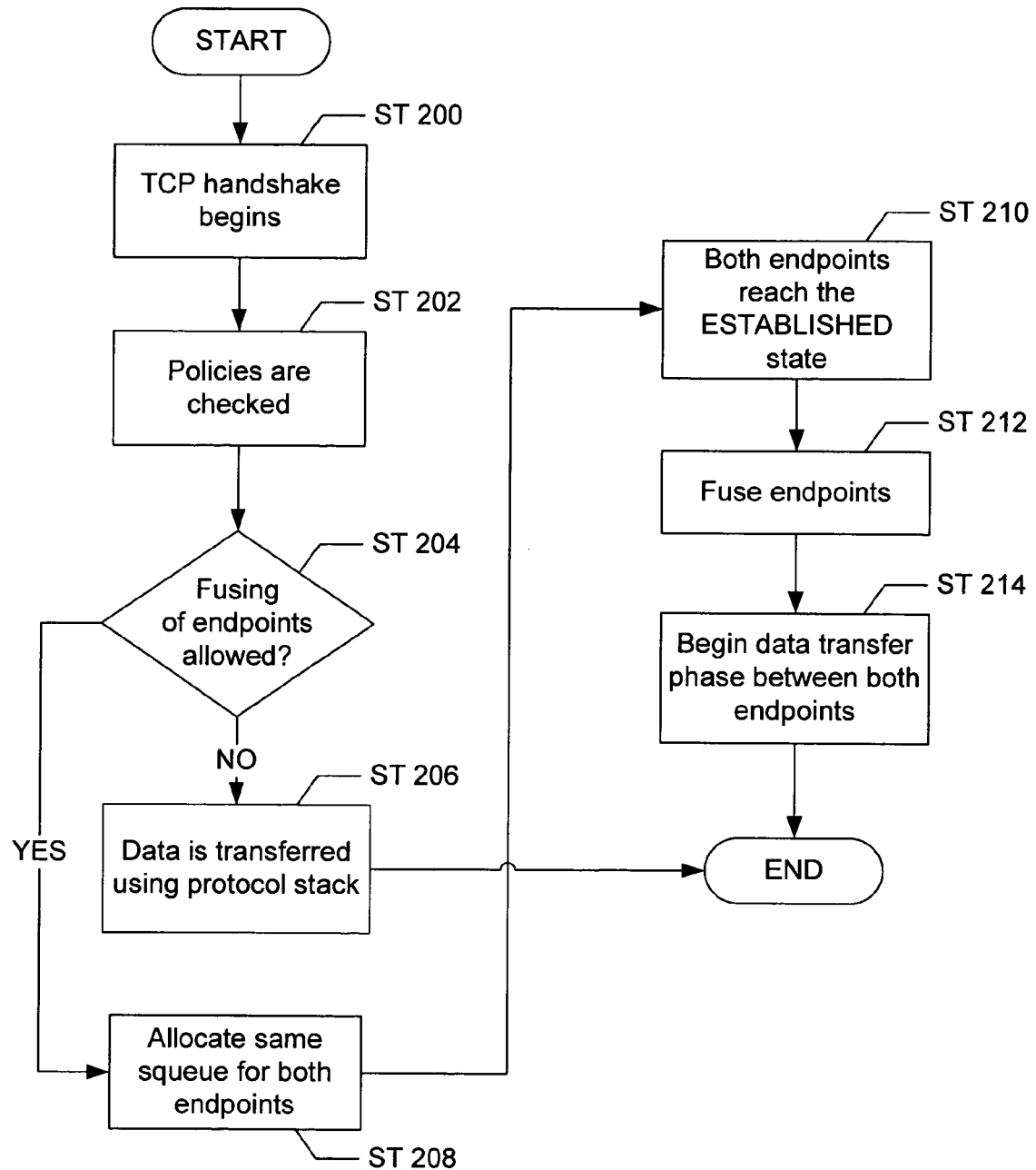
FIG. 2 shows a flow chart for setting up a transport loopback mechanism in accordance with one embodiment of the invention.

FIG. 2 shows a flow chart for setting up a TCP loopback connection in accordance with one embodiment of the invention. Initially, the TCP connection handshake between a server and a client begins (Step 200). As described above, the server and the client may be any two processes in communication with each other on the same host machine. The server and the client are both known as TCP endpoints. Those skilled in the art will appreciate that the TCP handshake is performed using handshake methods well known in the art, where several steps are performed to authenticate each endpoint and exchange data between the endpoints.

Subsequently, during the TCP handshake, policies associated with the communication between both endpoints are checked (Step 202). In one embodiment of the invention, policies may indicate whether or not two endpoints are permitted to communicate/exchange data. For example, a policy may indicate that Application A is only allowed to exchange encrypted data with Application B. In this case, if Application A and Application B are attempting to communicate using a TCP loopback mechanism, the policy dictates that a TCP loopback connection may not be permitted.

Those skilled in the art will appreciate that several other policies associated with different processes may exist. For example, if a particular operating system defines containers in which applications execute, then policies may define which contains are permitted to communication with which other containers. Further, those skilled in the art will appreciate that if the TCP connection employs special features, such as special IP options, the connection may be marked as ineligible for the TCP loopback mechanism.

At this stage, a determination is made whether fusing of both endpoints is permitted (Step 204). In one embodiment of the invention, if a policy check indicates that the two endpoints are not permitted to communication or places other restrictions on the communication between the two endpoints (e.g., encryption), then fusing the two endpoints may not be permitted. In this case, the data transfer between the two endpoints is performed using the network protocol stack (Step 206), and the "shortcut" enabled by fusing the two endpoints to form a TCP loopback connection is not performed. Therefore, the data transfer is processed through the IP layer and delivered to the receiving endpoint in a traditional manner via the network.

Alternatively, if no restrictions exist on the communication between the two endpoints, then fusing the two endpoints may be permitted. In this case, a serialization queue is allocated for both endpoints (Step 208). Mores specifically, at connection establishment time, the client TCP loopback endpoint (i.e., the endpoint actively performing the TCP connection) is assigned a particular serialization queue, and the server TCP endpoint (i.e., the endpoint passively accepting the TCP connection) is assigned the same serialization queue that has already been allocated for the client TCP endpoint. As described above, serialization queues are associated with particular CPUs. Thus, by allocating both endpoints the same serialization queue, one processor carries out the data transfer between both endpoints. Further, in one embodiment of the invention, because the serialization queue processes packets uninterrupted, allocating the same serialization queue for both endpoints guarantees that access to both endpoints' data structures are serialized (i.e., happen in the intended order), which acts as a locking mechanism that ensures that one of the endpoints does not "go away" while the other endpoint is writing or transferring data. Said another way, the order of the data transfer operations is maintained, such that the data transfer may be performed in a traditional manner, i.e., using the network protocol stack, when necessary, without any loss of data.

Continuing with FIG. 2, upon successful completion of the TCP handshake, both TCP endpoints are placed in the ESTABLISHED state (Step 210). In one embodiment of the invention, once the endpoints reach the ESTABLISHED state, the endpoints are fused with each other (i.e., both endpoints are made aware of each other) (Step 212), completing the set up portion of the TCP loopback connection and beginning the data transfer phase (Step 214).

Figure 3:
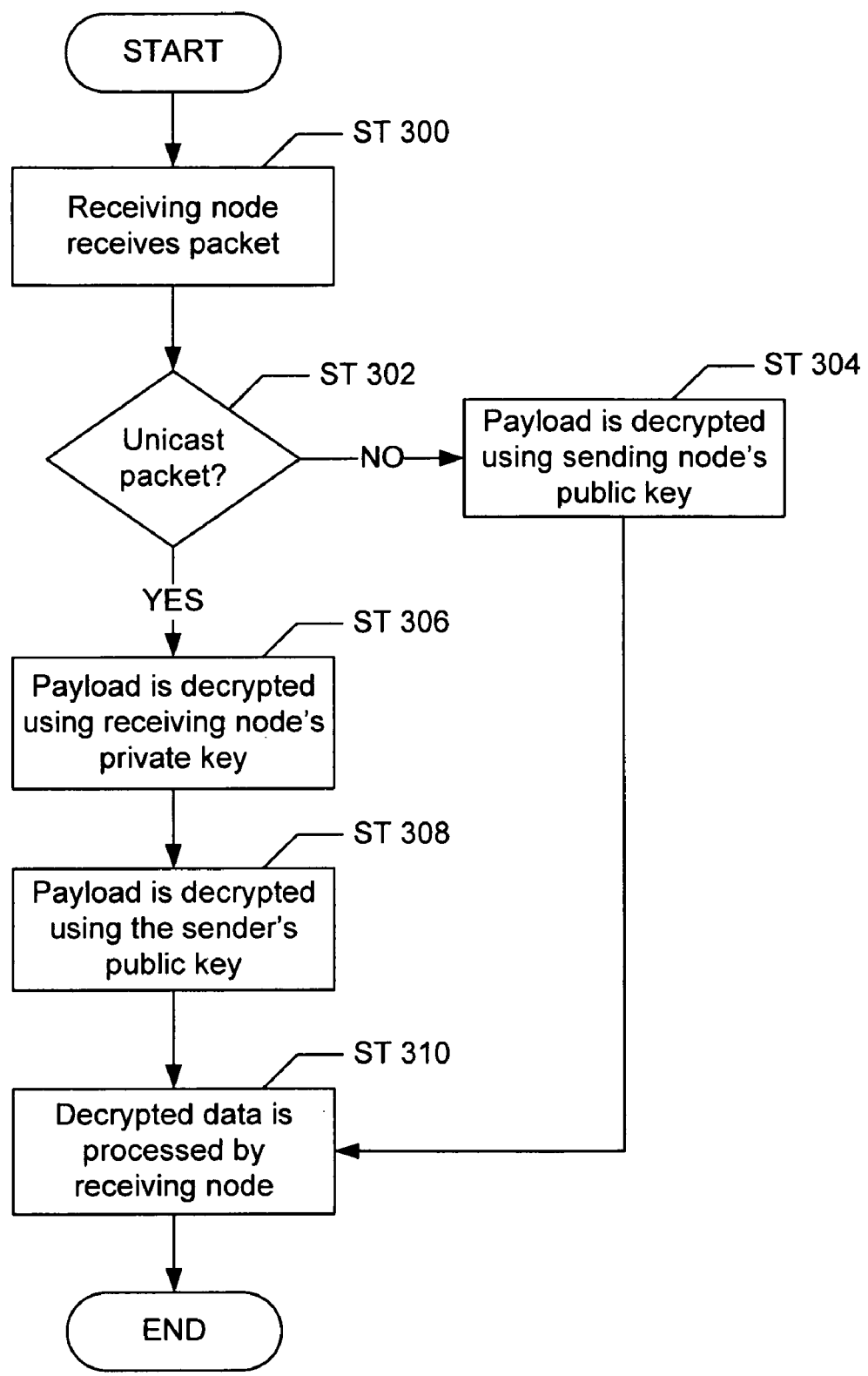
FIG. 3 shows a flow chart for transferring data between two fused endpoints in accordance with one embodiment of the invention.

FIG. 3 shows a flow chart for the data transfer phase of the TCP loopback connection in accordance with one embodiment of the invention. Initially, the transmitting endpoint writes data to the receiving endpoint (Step 300). Subsequently, the data is queued in the TCP stack associated with the receiving endpoint (Step 302). In one embodiment of the invention, when the first packet is queued at the receiving endpoint, TCP triggers a signal to the receiving endpoint, notifying the receiving endpoint that data has been queued (Step 304). Upon receiving the signal, the receiving endpoint completes its current task and pulls the data from the queue in the TCP stack (Step 306).

In one embodiment of the invention, because the transmitting endpoint may be writing more data while the queued data is waiting to be pulled by the receiving endpoint, the longer the receiving endpoint takes to complete its current task, the more data the receiving endpoint can pull at one time. For example, suppose that the receiving endpoint has just pulled data from the queue and is processing the data. While the receiving process is processing the data, suppose the transmitting process continues to write data. In this case, it becomes more efficient for the receiving endpoint to pull the data once all the data is written or when the queue is full. Thus, the longer it takes the receiving process to process data and/or complete other tasks, reading queued data becomes more efficient.

Continuing with FIG. 3, in one embodiment of the invention, the receiving endpoint may not pull all the data that is queued. Thus, a determination is made as to whether the queue is empty (Step 308). When the receiving endpoint receives the signal to pull data, the receiving endpoint requests the processor to read a particular number of bytes. If the enqueued data exceeds the number of bytes requested by the receiving endpoint, then the receiving endpoint does not pull all the queued data.

In this case, a second signal is triggered to indicate to the receiving endpoint that data remains in the queue (Step 310). In one embodiment of the invention, the second signal is triggered in the "PULL" entry of the receiving endpoint's TCP layer, where as the signal triggered when the initial packet of data is queued is triggered from the "QUEUE" entry of the receiving endpoint's TCP layer. Thus, two signaling mechanisms exist within the receiving endpoint's TPC layer, and the receiving endpoint includes functionality to know which signaling mechanism is being used when the signal is received.

Alternatively, if the receiving endpoint pulls all the enqueued data, then a determination is made whether one of the endpoints has requested a close to the TCP loopback connection (Step 312). A close function is issued by an endpoint when the endpoint wishes to terminate the TCP loopback connection. If a close has been requested, then the endpoints are unfused (Step 314). Thus, the endpoints are no longer aware of each other, and any data exchanged subsequent to the close is performed using the network protocol stack (i.e., normal TCP/IP processing) (Step 316). Alternatively, if a close has not been issued, then the Steps 300-312 are repeated for subsequent data transfers between the two TCP endpoints.

In one embodiment of the invention, because the data transfer is serialized by the serialization queue, a close issued by an endpoint while the other endpoint is still writing data does not result in the loss of data. Rather, in one embodiment of the invention, the endpoints are unfused when the close request is processed by the serialization queue, and any data written thereafter is processed using the network protocol stack.

To illustrate the functionality provided by the serialization queue, consider the example in which Application A performs two separate writes to Application B, Application B subsequently issues a close, and Application A performs another write operation after Application B issues the close. In this case, the first two write operations performed by Application A are processed using the "shortcut" TCP loopback connection. Because the serialization queue maintains the order of the data transfer, the close issued by Application B is processed next. When the serialization queue processes the close, the TCP endpoints (i.e., Application A and Application B) are unfused. Thus, the last write operation performed by Application A follows the normal network protocol processing before Application B receives the data. Thus, in one embodiment of the invention, the serialization queue enables the system to revert back to the network protocol stack in the event that an endpoint requests a close of the TCP loopback connection. Those skilled in the art will appreciate that a close may be issued at any time during the TCP loopback connection.

In one embodiment of the invention, if urgent data is sent from one endpoint to another endpoint, a special bit "URG" is set in the packet header, marking the data as urgent. More specifically, prior to TCP processing and packetization, urgent data is noted by marking the data with a special indicator. Those skilled in the art will appreciate that the indicator used to mark urgent data may differ in different operating systems. In embodiments of the present invention, because there is no TCP processing and no TCP packet header, the urgent data, including the special indicator, is transferred from one endpoint to the other endpoint. Those skilled in the art will appreciate that the special indicator may be slightly modified to denote the change of direction, i.e., from kernel to user instead of from user to kernel. In one embodiment of the invention, when the urgent data is queued, the receiving endpoint is signaled with an urgent signal. Subsequently, instead of queuing the data at the receiving endpoint, the urgent data is pushed up to the receiving process, and the receiving process retrieves the urgent data immediately. In this manner, the urgent data is not waiting in a queue to be pulled by the receiving process.

Figure 4:
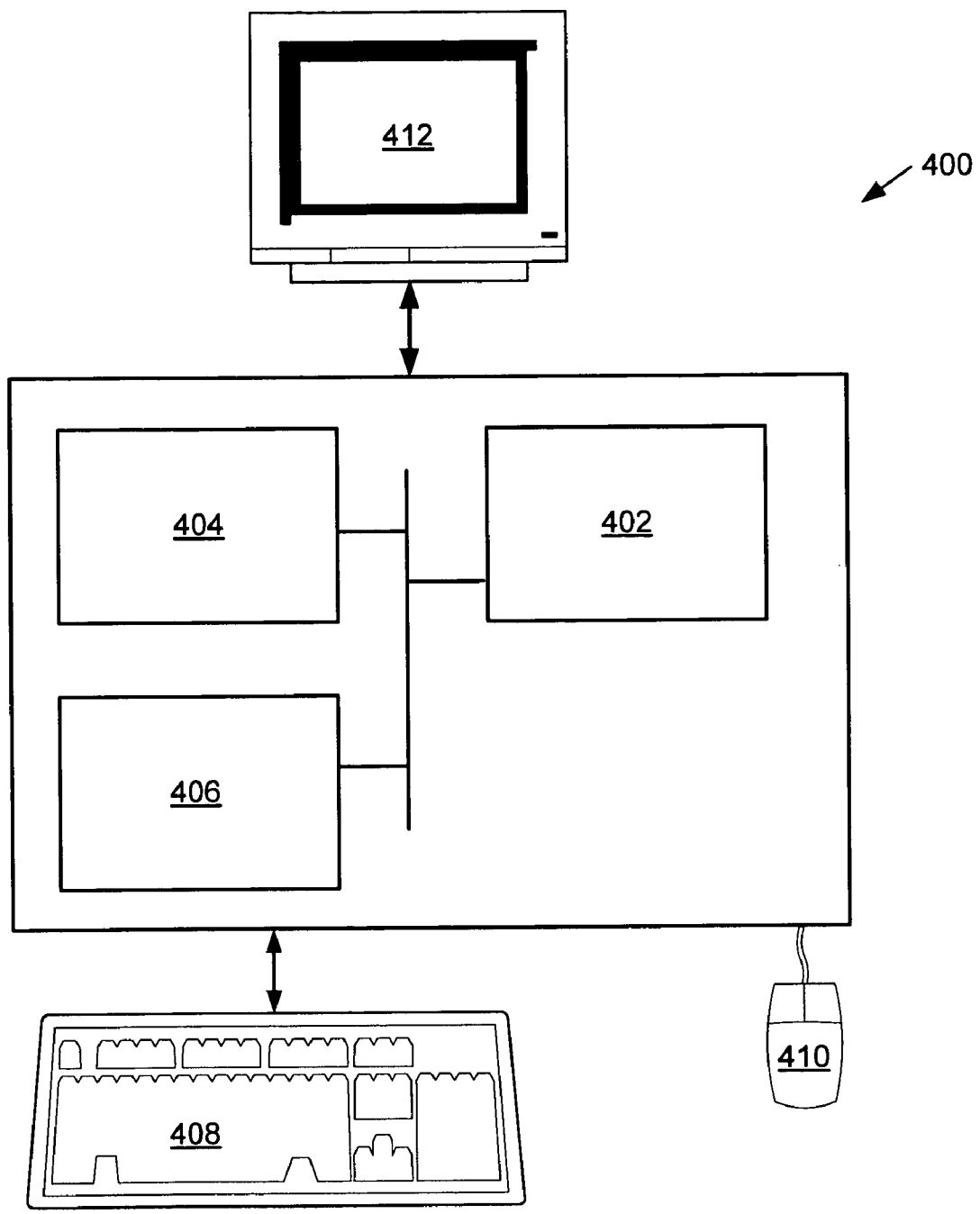
FIG. 4 shows a computer system in accordance with one embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention allow for applications using TCP loopback connections to perform faster, due to the more efficient processing done at the kernel/system level, while still preserving any policies that define the interaction between particular endpoints. Further, embodiments of the invention provide a method for optimizing the TCP loopback communication channel between two endpoints by short-circuiting, or fusing, the two endpoints. In addition, by assigning the same serialization queue to two TCP endpoints communicating using a TCP loopback connection, the present invention ensures that the order of operations initiated by the endpoints is maintained.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data transfer using a transmission control protocol (TCP) connection, comprising:
    establishing a TCP connection between a first endpoint and a second endpoint, wherein the first and second endpoints are located on a single host machine, wherein the first endpoint comprises a first process and wherein the second endpoint comprises a second process, wherein the first endpoint and the second endpoint are associated with a network protocol stack, and wherein the network protocol stack comprises a TCP layer, an internet protocol (IP) layer, and a hardware layer;
    determining that fusing of the first endpoint with the second endpoint is permitted; and
    fusing, based on the determination, the first endpoint with the second endpoint to obtain a path between the first endpoint and the second endpoint by:
        assigning the first endpoint to a serialization queue, wherein the serialization queue is associated with the single host machine, and
        allocating assigning the second endpoint to the serialization queue; and
    transferring data between the endpoints after fusing, using the path, wherein the data is processed by the TCP layer of the network protocol stack, and the IP layer and the hardware layer of the network protocol stack are bypassed when the data is transferred via the path between the first and the second endpoints.

2. The method of claim 1, wherein transferring data from the first endpoint to the second endpoint, comprises:
    queuing the data in a queue at the second endpoint;
    signaling the second endpoint to read the queued data;
    determining whether the queue is empty; and
    signaling the second endpoint to read the remaining data, if the queue is not empty.

3. The method of claim 2, wherein signaling the second endpoint to read the queued data when the queue is not empty comprises signaling a PULL entry associated with the second endpoint.

4. The method of claim 1, further comprising:
    unfusing the first endpoint from the second endpoint, if the first endpoint or the second endpoint closes the TCP connection.

5. The method of claim 4, wherein unfusing the first endpoint from the second endpoint results in transferring data using the network protocol stack.

6. The method of claim 1, wherein establishing the TCP connection comprises performing a handshake between the first endpoint and the second endpoint to reach an ESTABLISHED state.

7. The method of claim 1, wherein determining fusing the first endpoint with the second endpoint is permitted comprises checking policies associated with the communication between the first endpoint and the second endpoint.

8. The method of claim 1, wherein the serialization queue is configured to maintain the order of the data transfer between the first endpoint and the second endpoint.

9. The method of claim 1, wherein fusing the first and second endpoint located on the single host machine comprises making both the first endpoint and the second endpoint aware of each other by forming a direct path for data communication between the first endpoint and the second endpoint.

10. A system, comprising:
    a first endpoint configured to transfer data to a second endpoint, wherein the data is transferred using a transmission control protocol (TCP) connection and wherein the first and second endpoints are located on a single host machine, wherein the first endpoint comprises a first process and wherein the second endpoint comprises a second process, and wherein the first endpoint and the second endpoint are associated with a network protocol stack, and wherein the network protocol stack comprises a TCP layer, an internet protocol (IP) layer, and a hardware layer; and
    a serialization queue assigned to the first endpoint and the second endpoint, wherein the serialization queue is configured to maintain the order of the data transfer, and wherein the serialization queue is associated with the single host machine,
    wherein the first endpoint and the second endpoint are fused to form the TCP connection, wherein the TCP connection forms a path between the first endpoint and the second endpoint, and wherein the transferred data is processed by the TCP layer of the network protocol stack, and the IP layer and the hardware layer of the network protocol stack are bypassed.

11. The system of claim 10, wherein the first endpoint and the second endpoint located on the single host machine are fused by making both the first endpoint and the second endpoint aware of each other by forming a direct path for data communication between the first endpoint and the second endpoint.

12. The system of claim 10, wherein the first endpoint and the second endpoint establish the TCP connection by performing a handshake between the first endpoint and the second endpoint.

13. The system of claim 12, wherein the serialization queue is allocated to the first endpoint and the second endpoint during the handshake.

14. The system of claim 12, wherein the first endpoint and the second endpoint are fused upon completion of the handshake and when the first endpoint and the second endpoint are in the ESTABLISHED state.

15. The system of claim 10, wherein the first endpoint and the second endpoint are unfused, if the first endpoint or the second endpoint closes the TCP connection.

16. The system of claim 15, wherein unfusing the first endpoint from the second endpoint results in processing data exchanged between the first endpoint and the second endpoint using the network protocol stack.

17. The system of claim 10, wherein transferring data from the first endpoint to the second endpoint, comprises:
   queuing the data in a queue at the second endpoint;
   signaling the second endpoint to read the queued data;
   determining whether the queue is empty; and
   signaling the second endpoint to read the remaining data, if the queue is not empty.

18. The system of claim 17, wherein signaling the second endpoint to read the queued data when the queue is not empty comprises signaling at the PULL entry associated with the second endpoint.

19. A computer system for data transfer using a TCP loop-back connection, comprising:
   a processor;
   a memory;
   a storage device; and
   software instructions stored in the memory for enabling the computer system under control of the processor, to:
      establish a transmission control protocol (TCP) connection between a first endpoint and a second endpoint, wherein the first and second endpoints are located on a single host machine, wherein the first endpoint comprises a first process and wherein the second endpoint comprises a second process, and wherein the first endpoint and second endpoint are associated with a network protocol stack, and wherein the network protocol stack comprises a TCP layer, an internet protocol (IP) layer, and a hardware layer;
   determine that fusing of the first endpoint with the second endpoint is permitted; and
   fusing the first endpoint with the second endpoint to obtain a path between the first endpoint and the second endpoint by:
      assigning the first endpoint to a serialization queue, wherein the serialization queue is associated with the single host machine, and
      assigning the second endpoint to the serialization queue; and
   transferring data between the endpoints after fusing, using the path, wherein the data is processed by the TCP layer of the network protocol stack, and the IP layer and the hardware layer of the network protocol stack are bypassed when the data is transferred via the path between the first and the second endpoints.

* * * * *

UNITED STATES PATENT AND TRADEMARK OFFICE
CERTIFICATE OF CORRECTION

| | | |
|---|---|---|
| PATENT NO. | : 7,839,875 B1 | Page 1 of 1 |
| APPLICATION NO. | : 11/179702 | |
| DATED | : November 23, 2010 | |
| INVENTOR(S) | : Cahya Adiansyah Masputra et al. | |

It is certified that error appears in the above-identified patent and that said Letters Patent is hereby corrected as shown below:

In Claim 1, Column 7 (line 48), "allocating" should be deleted.

Signed and Sealed this
Twenty-second Day of February, 2011

David J. Kappos
*Director of the United States Patent and Trademark Office*